United States Patent
Mic et al.

(10) Patent No.: US 12,175,288 B2
(45) Date of Patent: *Dec. 24, 2024

(54) METHODS AND SYSTEMS FOR PROCESSING REQUESTS USING LOAD-DEPENDENT THROTTLING

(71) Applicant: Shopify Inc., Ottawa (CA)

(72) Inventors: Robert Mic, St. Thomas (CA); Aline Fatima Manera, Kitchener (CA); Timothy Willard, Kitchener (CA); Nicole Simone, Kitchener (CA); Scott Weber, Kitchener (CA)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,254

(22) Filed: Oct. 13, 2023

(65) Prior Publication Data

US 2024/0045717 A1 Feb. 8, 2024

Related U.S. Application Data

(63) Continuation of application No. 17/675,093, filed on Feb. 18, 2022, now Pat. No. 11,822,959.

(51) Int. Cl.
*G06F 9/48* (2006.01)
*G06F 1/08* (2006.01)
*G06F 9/50* (2006.01)
*G06F 9/54* (2006.01)

(52) U.S. Cl.
CPC .............. *G06F 9/4881* (2013.01); *G06F 1/08* (2013.01); *G06F 9/5005* (2013.01); *G06F 9/54* (2013.01)

(58) Field of Classification Search
CPC ........ G06F 9/4881; G06F 1/08; G06F 9/5005; G06F 9/54
See application file for complete search history.

(56) References Cited

U.S. PATENT DOCUMENTS

| | | |
|---|---|---|
| 9,424,077 B2 | 8/2016 | Geng et al. |
| 2003/0184795 A1 | 10/2003 | Shahindoust et al. |
| 2005/0154827 A1 | 7/2005 | Patterson et al. |
| 2017/0235605 A1 | 8/2017 | Chaloupka et al. |
| 2018/0004556 A1 | 1/2018 | Marriner et al. |
| 2022/0405138 A1 | 12/2022 | Prathima et al. |
| 2022/0413913 A1 | 12/2022 | Harjono et al. |
| 2023/0108553 A1 | 4/2023 | Brooks et al. |

OTHER PUBLICATIONS

Notice of Allowance, U.S. Appl. No. 17/675,093, filed Sep. 6, 2023.
CA Office Action, 3,169,195 Sep. 19, 2023.

*Primary Examiner* — Corey S Faherty
(74) *Attorney, Agent, or Firm* — Rowand LLP

(57) ABSTRACT

Methods and systems for processing requests with load-dependent throttling. The system compares a count of active job requests being currently processed for a user associated with a new job request with an active job cap number for that user. When the count of active job requests being currently processed for that user does not exceed the active job cap number specific to that user, the job request is added to an active job queue for processing. However, when the count of active job requests being currently processed for that user exceeds the active job cap number, the job request is placed on a throttled queue to await later processing when an updated count of active job requests being currently processed for that user is below the active job cap number. Once the count is below the cap, the throttle request is moved to the active job queue for processing.

20 Claims, 7 Drawing Sheets

FIG. 8

METHODS AND SYSTEMS FOR PROCESSING REQUESTS USING LOAD-DEPENDENT THROTTLING

CROSS-REFERENCE TO RELATED APPLICATIONS

The present application is a continuation of U.S. patent application Ser. No. 17/675,093, filed Feb. 18, 2022, the contents of which are hereby incorporated by reference.

TECHNICAL FIELD

The present disclosure relates to computer-implemented request processing systems and methods and, in particular, systems and methods utilizing load-dependent throttling of requests.

BACKGROUND

Computing resources are limited. Even in the case of multi-user platforms implemented on large server farms, computing resources need to be managed and allocated carefully. In a multi-user platform the global resources of the platform need to be allocated so as to substantially simultaneously service a huge number of active users and meet service standards. Managing computing resource usage in a way that avoids or minimizes failed actions and yet avoids long wait times is challenging.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
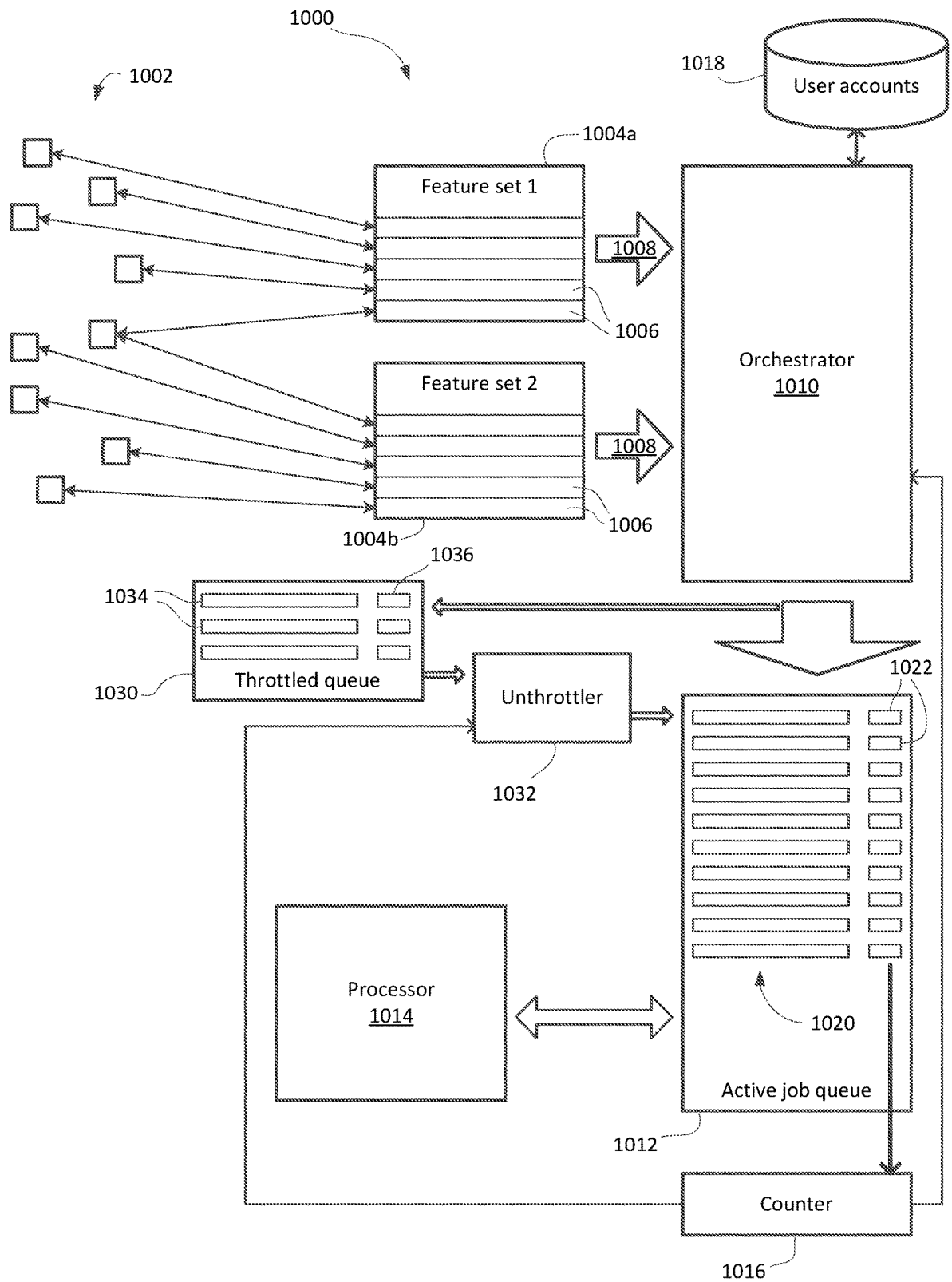
FIG. 1 is a simplified example system.

In one aspect, the present application discloses a computing device that includes one or more processors; one or more data storage units; and an application stored in the one or more data storage units. The application may include processor-readable instructions that, when executed by the one or more processors, are to cause the one or more processors to receive a job request to implement one or more actions, the job request associated with a particular user; compare a count of active job requests being currently processed for the particular user with an active job cap number for that user; and selectively process the job request based on the comparison of the count of active job requests currently processed for the particular user with the active job cap number for that user. When the count of active job requests being currently processed for the particular one of the users does not exceed the active job cap number, the job request is added to an active job queue for processing, and when the count of active job requests being currently processed for the particular user exceeds the active job cap number, the job request is placed on a throttled queue to await later processing when an updated count of active job requests being currently processed for the particular user is below the active job cap number for that user.

Advantageously, the computing device may facilitate access for all users by allocating capacity for processing requests on a per-user basis, while avoiding failed requests through temporary queuing of requests that would otherwise fail due to the active job cap number. This prevents the system from being flooded, intentionally or not, by a huge number of requests relating to one user and thereby blocking access to all other users; yet avoids failure of legitimate requests during high demand situations through temporary queueing. This helps in maintaining quality of service by balancing throughput and latency concerns with equitable access and allocation of resources.

In some implementations, the instructions, when executed by the one or more processors, are to cause the one or more processors to later process the job request added to the throttled queue by transferring the job request from the throttled queue to the active job queue. In some cases, the instructions are to further cause the processors to determine the updated count of active job requests being currently processed for the particular user in response to detecting an unthrottling trigger event.

In some implementations, the active job cap number for the particular user is associated with a feature set corresponding to the job request.

In some implementations, the active job queue includes, for each job request in the active job queue, a user identifier identifying a user associated with that job request. In some cases, the instructions are to further cause the one or more processors to determine the count of active job requests being currently processed for the particular user by counting a number of user identifiers in the active job queue identifying that user.

In some implementations, the instructions, when executed by the one or more processors, are to cause the one or more processors to place the job request on the throttled queue on condition that the one or more processing units determine that the job request is not a high priority job request.

In some implementations, the instructions, when executed by the one or more processors, are to further cause the one or more processors to receive a second job request to implement a second action associated with the particular user; determine that a current count of active job requests being processed for the particular user exceeds the active job cap number for that user; determine that the second job request is a high priority job request; and in response, add the second job request to the active job queue instead of the throttled queue.

In some implementations, the job request is generated responsive to detecting a trigger condition associated with the action.

In another aspect, the present application discloses a computer-implemented method that includes receiving a job request to implement one or more actions, the job request associated with a particular user; comparing a count of active job requests being currently processed for the particular user with an active job cap number for that user; and selectively processing the job request based on the comparison of the count of active job requests currently processed for the particular user with the active job cap number for that user. When the count of active job requests being currently processed for the particular user does not exceed the active job cap number, the job request is added to an active job queue for processing, and when the count of active job requests being currently processed for the particular user exceeds the active job cap number, the job request is placed on a throttled queue to await later processing when an updated count of active job requests being currently processed for the particular user is below the active job cap number for that user.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

The present application relates to multi-user computing platforms on which users may configure or request actions that are triggered by events or states. Those actions, or "job requests" may be grouped into different feature sets, where the job requests or actions relating to one feature set may be related in objective or purpose or application. One illustrative example of such a platform is a multi-merchant e-commerce platform on which there are a huge number of merchant accounts relating to hosted merchant sites and millions of active users browsing and using those sites such that various job requests are triggered. Each job request is in relation to a particular one of the merchant accounts. Although the present application uses an e-commerce platform as an illustrative example of a multi-user computing platform, it will be appreciated that the present application is not necessarily limited to multi-merchant e-commerce platforms.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

As noted above, large multi-user platforms may experience a huge number of job requests, meaning a significant competing demand for computing resources. The demand on computing resources may exceed available resources in some cases, resulting failed or refused or incomplete job requests. In some cases, portions of the platform or its functionality may be partitioned or isolated from other portions to prevent excessive job requests in one portion from impacting computing operations in another portion. To avoid failed or refused job requests, the platform may have an active job queue to which new job requests are added and from which the processor (generally, the job processing resources of the platform) works to process job requests. An active job queue may be processed serially or in parallel (or partly in serial and in parallel).

Even a platform that provides for an active job queue may find instances in which the queue size is exceeded or in which the queue is inadvertently or maliciously flooded with job requests that results in unacceptably long delays in processing new job requests.

It would be advantageous to provide for a system and method that improves upon existing multi-user platforms by better handling of job requests that consume platform computing resources.

Advantageously, example systems and methods described below facilitate access for all users by allocating capacity for processing requests on a per-user basis, while avoiding failed requests through temporary queuing of requests that would otherwise fail due to a user reaching a maximum active request count. The reliance on active count rather than a rate of requests accommodates flash events provided the capacity is available, and relies on queuing if capacity is reached on a per-user basis. The systems and methods described herein blocking user access to resources as a result of a flash event by one user flooding the system. They nevertheless also avoid failing or refusing legitimate requests during high demand situations.

Reference will now be made to FIG. 1, which diagrammatically illustrates a simplified example system 1000 in accordance with an aspect of the present application. The system 1000 may be a multi-user platform accessible to a plurality of users 1002. Users 1002 exchange communications with the system 1000 via respective user devices over one or more computing networks using suitable network protocols.

The system 1000 may include two more defined feature sets 1004a, 1004b (collectively 1004). Each feature set 1004 is associated with a set of actions or functions that may selectively be configured by one or more of the users 1002 to define user-configured actions 1006. A user-configured action 1006 may include a defined operation or function and a trigger event or condition or state. The user-configured action 1006 may provide that when the trigger event or condition occurs, then a particular operation or function is generated. The generated operation or function is a job request 1008. The job request 1008 is an executable or actionable request that the computing resources of the system 1000 carry out. It will be appreciated that each job request 1008 generated by a user-configured action 1006 is associated with the particular one of the users 1002 that implemented the user-configured action 1006.

In this example, the system 1000 includes an orchestrator 1010. As job requests 1008 are generated the orchestrator 1010 receives the job requests 1008 and determines whether to add the job requests 1008 to an active job queue 1012. The orchestrator 1010 may be a software routine or application or other programming construct configured to detect or receive newly-generated job requests 1008 and to route them appropriately, as will be described further below. In some cases, the orchestrator 1010 may validate requests, so as to confirm that a new job request 1008 is properly formatted or constructed, and that it is an authorized or permitted action or operation. The orchestrator 1010 may, in some instances, authenticate the job request 1008, for example through digital signature verification or other such processes.

The active job queue 1012 may be a data structure or stack or other list-based construct for containing details of job requests currently being actively processed by the system 1000. The active job queue 1012 may contain a plurality of data entries, where each data entry corresponds to one of the active jobs 1020, each having an associated user identifier (userID) 1022 that corresponds to the user 1002 associated with the user-configured action 1006 that generated the job request 1008 leading to the active job 1020. The data entry for each active job 1020 may include the action or process or function defining the job request, or index thereto, the userID 1022, and any associated metadata, such as a timestamp and/or queue index.

A processor 1014 may process active jobs in the active job queue 1012 as they are added to the active job queue 1012. In some implementations, the processor 1014 may process jobs 1020 in a first-in first-out (FIFO) order to prevent any jobs from becoming stuck in the active job queue 1012. In some implementations the processor 1014 includes multiple processors, multi-threaded processors, multi-core processors, and/or other types of computer processing resources. In some cases the processor 1014 executes a plurality of the active jobs 1020 in parallel. Some jobs 1020 may take longer to complete than others, and may involve communications with external systems or resources. As the processor 1014 completes or finishes an active job 1020, that active job 1020 is cleared from the active job queue 1012. Suitable queue management software, implemented within the processor 1014, the orchestrator 1010, or elsewhere, may manage the indexing, clearing, and shuffling, if any, of data entries in the active job queue 1012.

Data storage 1018 in the system 1000 may contain data regarding user accounts for the users 1002. Respective user accounts may have defined therein an active job cap number associated with that user. The active job cap number may be a maximum number of active jobs permitted to be processed at the same time for that user. That is, the active job cap number sets a user-specific maximum count of active job requests being processed at one time. In some implementations, the user account data includes more than one active job cap number. In particular, in some examples, each active job cap number is specific to a feature set. That is, each feature set of actions has a maximum number of concurrent job requests that can be processed for a particular user, as reflected in the user's active job cap number for that feature set. In some cases, the maximum number for each feature set is the same; in some cases, it is different.

In some implementations, the system 1000 may have more than one type of user. A first type of user may have the capability of configuring actions, such as administrator users, whereas the second type of user may not have that capability. The second type of user may interact with the system 1000 and those interactions may generate states, events, or conditions that may trigger one of the user-configured actions 1006 to generate a corresponding job request 1008. As an example, in an e-commerce platform, merchant users may have authority to configure actions, whereas ordinary or consumer users may not. As another example, in a multi-user game hosting platform, game developers or designers may be capable of configuring actions, whereas player users are not.

In accordance with one aspect of the present application, the system 1000 may further include a throttled queue 1030. When the orchestrator 1010 receives a newly-generated job request 1008 it may determine whether a count of active job requests being processed for the userID associated with the new job request 1008 is equal to or higher than the active job cap number for that userID. The active job cap number may be specific to the feature set 1004 from which the job request 1008 was generated. If the count of active jobs meets or exceeds the cap number, then the orchestrator 1010 may route the newly-generated job request 1008 to the throttled queue 1030 instead of the active job queue 1012.

The throttled queue 1030 is distinct from the active job queue 1012, although it may also contain data entries having the same types or categories of content. That is, each data entry in the throttled queue 1030 may correspond to a throttled job request 1034 and have an associated userID 1036.

The system 1000 may include a counter 1016 that monitors the active job queue 1012 and maintains a count of active jobs in the active job queue 1012 for each userID 1022 having at least one job in the active job queue 1012. The counter 1016 increments or decrements the count associated with each userID as an active job having that associated userID is added to or removed from the active job queue 1012. The count for each userID is provided to the orchestrator 1010. In some cases, an updated count for a particular userID is sent to the orchestrator 1010 each time it changes, i.e. each time it is incremented or decremented. In some cases, the counter 1016 maintains the counts in an accessible memory location indexed by userID, and from which the orchestrator 1010 may read a current count for a given userID from the memory location as a newly-generated job request 1008 is received by the orchestrator 1010. In some cases, the counter 1016 is implemented within the orchestrator 1010, but it is illustrated separately in FIG. 1 for ease of discussion.

Advantageously, the counter 1016 tracks the number of concurrent active job requests being processed for a specific userID, as opposed to a rate of job requests sent or generated, or some other metric. The number currently being processed may be a better measure of consumption of computing resources than some alternatives since some jobs have different completion times and some jobs can tie up resources for longer than others.

In cases where the active job cap number is specific to a feature set, the counter 1016 may track a count of concurrent active job requests being processed for a specific userID for each feature set 1004 for which a job request is being processed for that userID. In such a case, the data entry for each job request may further include a feature set field containing an identifier of the feature set 1004, or each userID 1022 may include suffix or other appended data specifying the feature set 1004 from which the respective job request 1008 was generated.

The system 1000 may further include an unthrottling routine 1032. The unthrottling routine 1032 may be a software routine, application, module or other programming construct configured to carry out the operations described herein. In some instances, the unthrottling routine 1032 is implemented as part of the orchestrator 1010, e.g. within the same application or program; however, it is illustrated separately in FIG. 1 for ease of explanation.

The unthrottling routine 1032 tracks the contents of the throttled queue 1030 and the count of active jobs in the active job queue 1012 for any userIDs that have throttled job requests 1034. The unthrottling routine 1032 detects when to "unthrottle" one of the throttled job requests 1034. In this regard, when the unthrottling routine 1032 determines that one of the throttled job requests 1034 should be unthrottled it may remove it from the throttled queue 1030 and transfer or move it to the active job queue 1012.

In one implementation, the unthrottling routine 1032 determines that a throttled job request 1034 should be processed when the count of active jobs in the active job queue 1012 drops below the active job cap number associated with the corresponding userID for the throttled job request 1034. In some cases, the unthrottling routine 1032 unthrottles jobs when the count of active jobs being processed for that userID drops more than a threshold amount below the active job cap number, such as to 75% or 50% of the active job cap number. In some cases, the unthrottling routine 1032 alternatively or also makes unthrottling conditional on the overall count of active jobs in the active job queue falling below a threshold number, thereby ensuring that the processor 1014 has ample overall capacity to clear the backlog of job requests build up for a given userID and is not currently overwhelmed with a mass of job requests for other userIDs. In some cases, the unthrottling routine 1032 may unthrottle a job request by moving it to the active job queue 1012 if it has been in the throttled queue 1030 for more than a maximum length of time, thereby ensuring that older jobs are not stuck in the throttled queue 1030 while a userID remains under maximum job request generation condition. Under those conditions, new job requests may get routed to the throttled queue 1030 while the oldest of the throttled job requests for that userID are released to the active job queue 1012.

In some implementations, the system 1000 may be configured to dynamically adjust the active job cap number. For example, the system 1000 may, based on signals detected or scheduled events, identify a high-load condition associated with a userID and, on that basis, allocate additional processing resources to that userID for a period of time by increasing the active job cap number for that userID. In some cases, the active job cap number for one or more other users may be reduced. In some implementations, the system 1000 may identify one or more low-load and/or latency-tolerant userIDs and may reduce their corresponding active job cap numbers to offset the increase for the userID under high-load condition, effectively dynamically reallocating processing resources from low-load users to high-load users.

In some implementations, job requests 1008 may have an associated priority. Some job requests 1008 may be of low or normal priority. Some job requests 1008 may have a high priority. The priority may be set at a platform-level dependent upon the type of action or operation specified. The priority may be configurable by the administrator user, subject to any platform policies or limits on use of high priority designations. In some cases, the orchestrator 1010 may avoid using the throttled queue 1030 in the case of a high priority job request. In that case, the high priority job request may be added to the active job queue 1012 despite the fact the count of concurrent job requests in the active job queue 1012 for that userID (and feature set, if caps are set on a feature set basis) exceeds the active job cap number. In another implementation, high priority job requests may be put in the throttled queue 1030, but the unthrottling routine 1032 may prioritize unthrottling of high priority job requests before other job requests.

Figure 2:
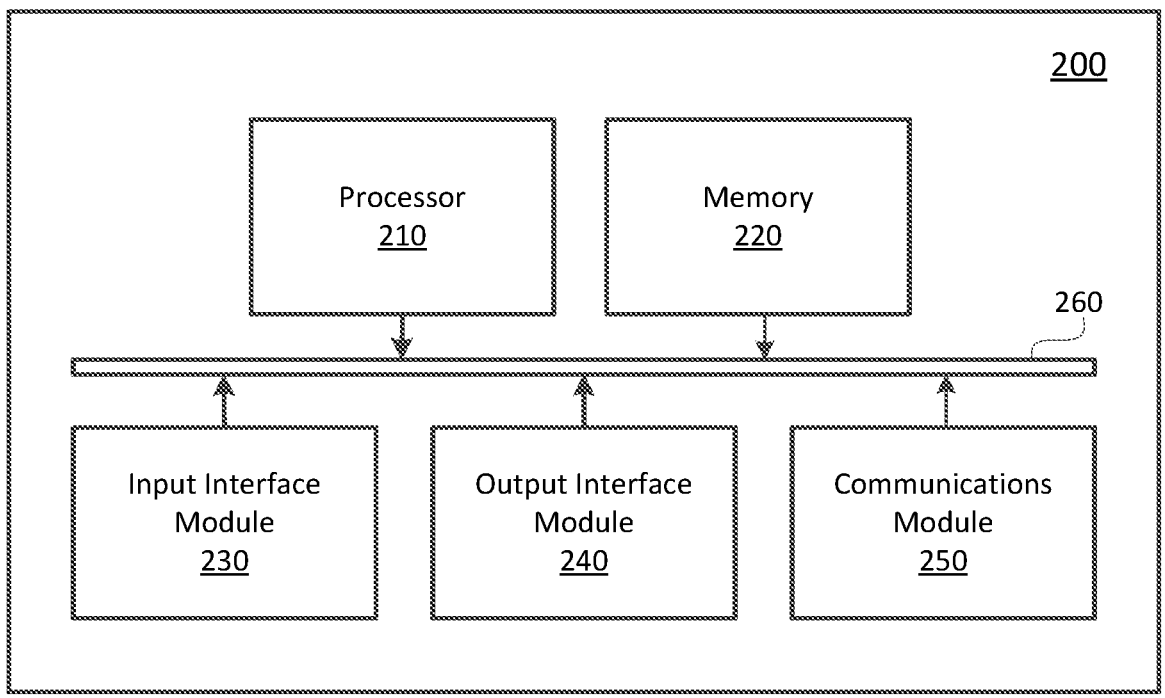
FIG. 2 is a high-level schematic diagram of a computing device.

The system 1000 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, via the Ethernet family of network protocols, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of the memory 220.

Figure 3:
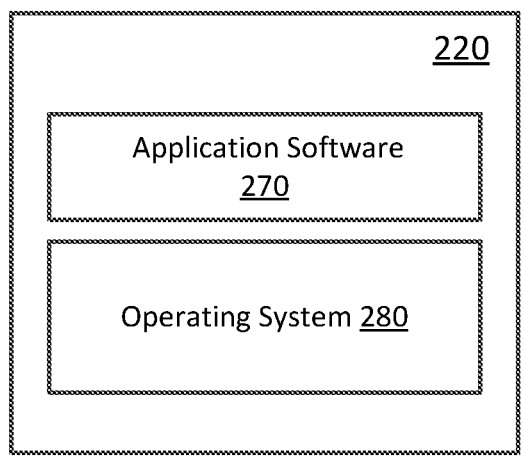
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations.

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

One or more of the computing devices 200 may be used to implement the system 1000 (FIG. 1) in some examples. User devices used by the users 1002 (FIG. 1) to access the system 1000 may be implemented by the computing devices 200 in some cases.

Figure 4:
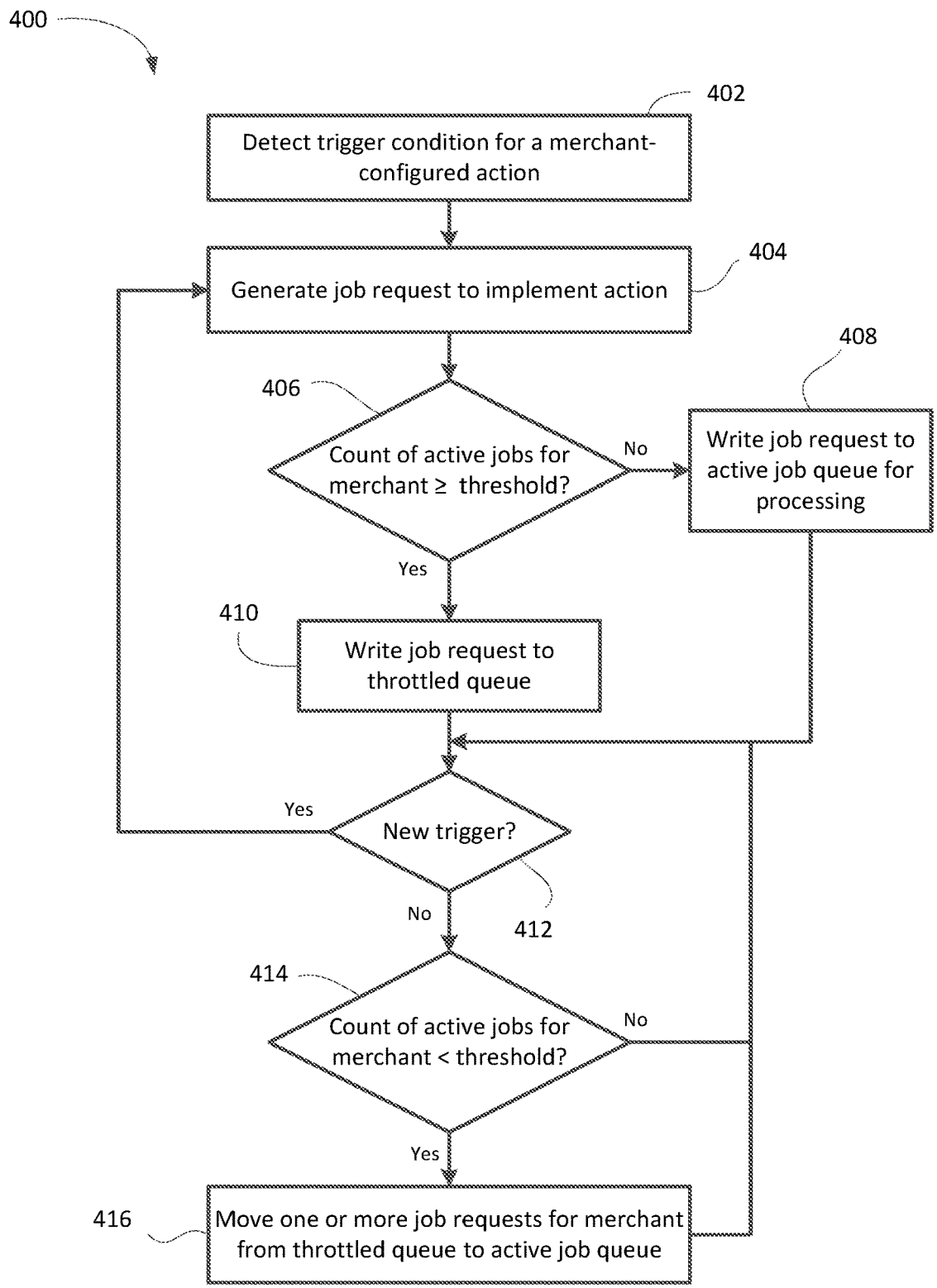
FIG. 4 shows one example method of processing job requests with per-user throttling.

Reference is now made to FIG. 4, which shows, in flowchart form, one example method 400 of processing requests with dynamic throttling. The method 400 may be implemented by a computing platform, such as an e-commerce platform in some cases. In particular, the method 400 may be implemented by way of suitably-programmed software instructions stored in memory on a computing device which, when executed by one or more processors of the computing device, cause the computing device to carry out the described operations.

The method 400 may initiate with detection of a trigger condition or other state or signal set in an administrator-configured action as indicated by operation 402. In the example case of an e-commerce platform, the action may be a merchant-configured action. For instance, the merchant may configure an action on the platform that generates an electronic message or notification to be sent to a registered user in response to detecting an abandoned shopping cart associated with the registered user after a pre-set period of time since abandonment. In another example, the merchant may configure an action on the platform that generates a set of electronic messages to be sent to a subset of registered users in response to determining that those registered users had not visited the merchant's online store in the past seven days.

Upon detecting the state, condition or signal, the system generates a job request specified in the administrator-configured action, as shown in operation 404. This job request has an associated userID specific to the administrator user that configured the action. In the case of an e-commerce platform hosting multiple merchants or shops, this userID may be the merchant or shop. The system, and in one particular example the orchestrator, determines whether the count of active job requests associated with the userID meets or exceeds an active job cap number for that userID, as indicated by operation 406. The count may be specific to job requests implementing actions from a specific one of the feature sets in some cases, and the active job cap number may be specific to both that userID and the feature set.

If the count does not exceed the active job cap number, then in operation 408 the system writes the new job request to the active job queue. Otherwise, the system writes the job request to the throttled queue as indicated by operation 410.

As shown by operations 412 and 414, the system then awaits receipt or detection of a new trigger condition that will result in generation of a new job request while continuing to monitor the counts of active job requests being processed, i.e. the count of job requests for a particular userID (and feature set in some cases) currently in the active job queue. If, in operation 414, the system determines that the count of active job requests for a userID has fallen below a threshold level, then in operation 416 the system moves at least one job request for that userID from the throttled queue to the active job queue. It then returns to operations 412 and 414 to await detection of a further trigger.

Figure 5:
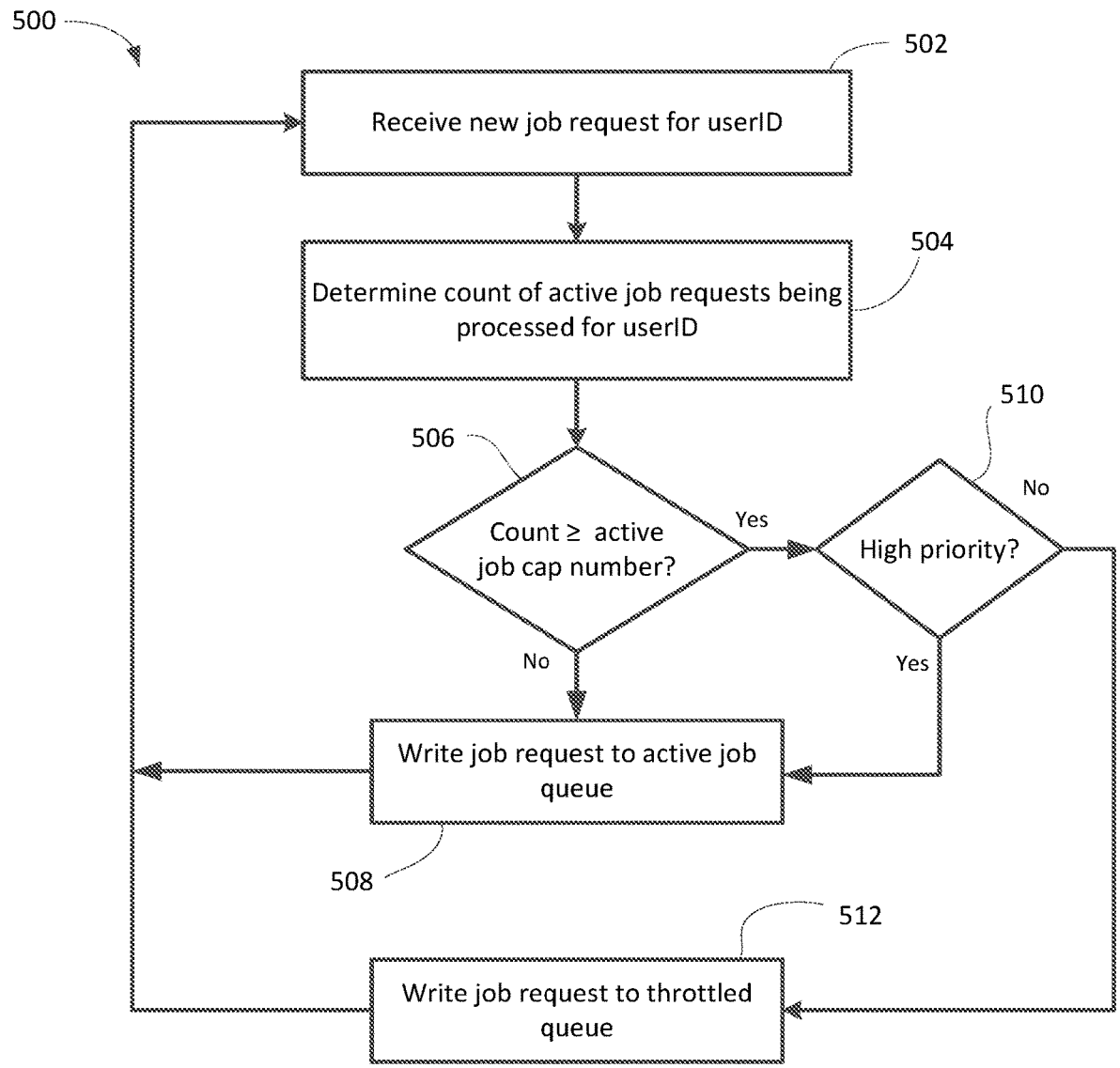
FIG. 5 shows one example method of processing job requests using user-dependent throttling, with priority signaling.

Reference will also now be made to FIG. 5, which shows, in flowchart form, one example method 500 of handling job requests under load conditions. The method 500 may be implemented by a computing device, such as the orchestrator 1010 (FIG. 1), in some cases. In this example, the queue management of the method 500 may be partly based on a priority designation associated with received job requests.

In operation 502, the orchestrator receives or obtains a new job request. The new job request may be associated with a userID and may be specific to a feature set in some cases. The job request may have an associated priority ranking. The priority ranking may be specified in the job request itself in some cases. The priority ranking may be inferred from the type or class of action or operation in the job request in some cases. A default normal priority may be associated with the lack of a priority ranking; that is, most job requests may have no indication of priority, indicating that they are of "normal" priority. Some job requests may have an indication, such as a flag or other indicator, signalling that they are of "high" priority.

The orchestrator, in operation 504, determines a count of active jobs being processed for that userID, and specific to that features set in some cases. The count may be read from a memory location storing a current count and maintained by a counter. The count may be indexed in the memory by way of the userID in some cases. In some cases, the orchestrator may query a counter for a current count associated with the userID. In some cases, the orchestrator may maintain its own count of active job requests for each userID. The count may be based on a count of the number of active job requests associated with the userID in the active job queue. The count may be updated periodically, may be updated with each change to the active job queue, or may be updated when an active job associated with the userID is added to, or removed from, the active job queue.

In operation 506, the orchestrator may assess whether the count meets or exceeds the active job cap number for that userID (and feature set, if specific to a feature set). If not, then the active job request may be written to the active job queue, as indicated by operation 508. However, if the count meets or exceeds the active job cap number for that userID, then the orchestrator may assess whether the job request is high priority or not, as indicated by operation 510. If it is high priority, then in this example the orchestrator writes the high priority job request to the active job queue despite the fact the count of active jobs for that userID already meets or exceeds the active job cap number. If the job request is not high priority, then the job request is written to the throttled queue as indicated by operation 512.

Figure 6:
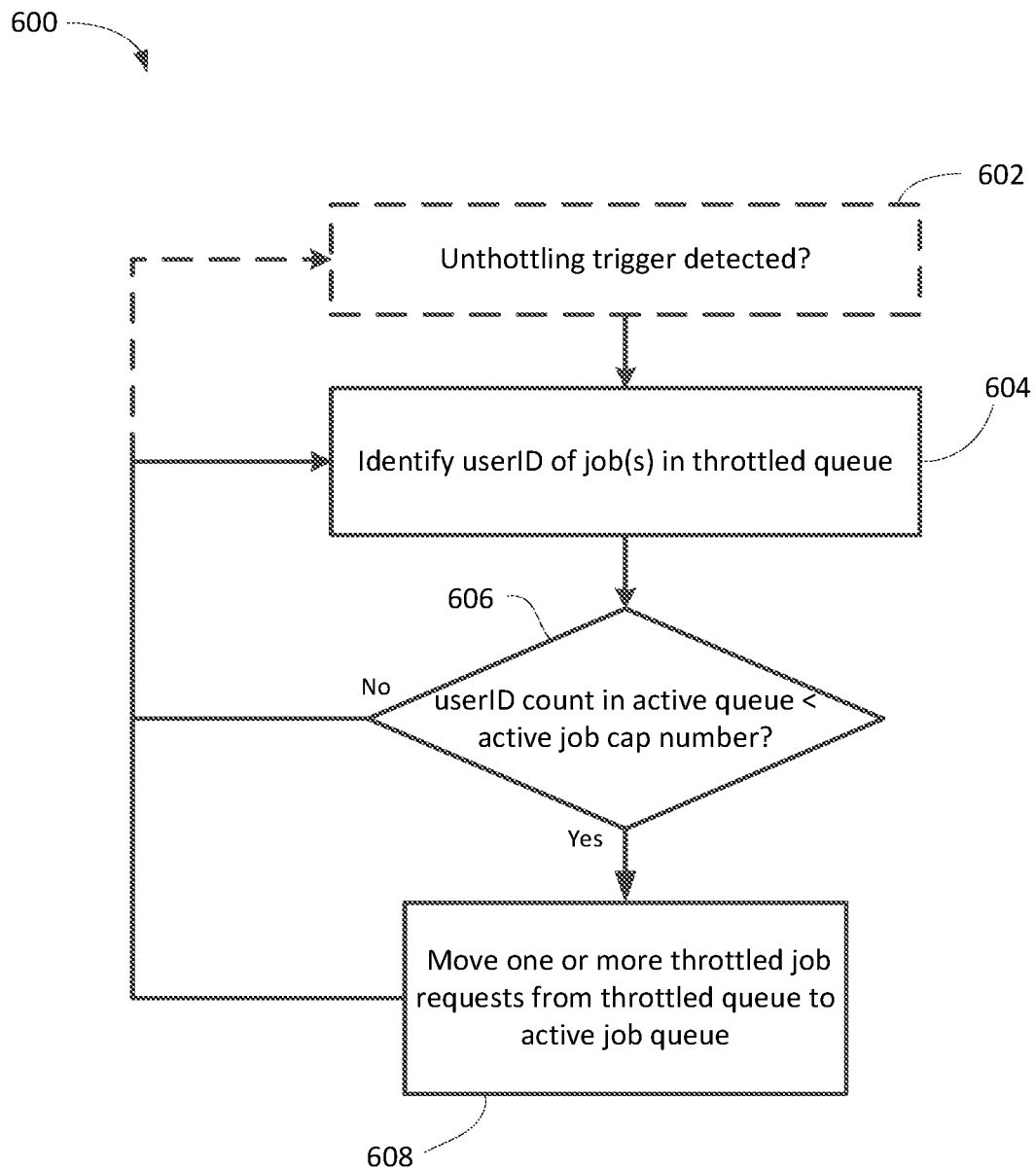
FIG. 6 shows one example method of selectively unthrottling throttled job requests.

FIG. 6 shows a simplified example method 600 for unthrottling throttled job requests. The method 600 may be implemented by an e-commerce platform and, in particular, may be implemented by way of suitably-programmed software instructions stored in memory on a computing device which, when executed by one or more processors of the computing device, cause the computing device to carry out the described operations. The method 600 may be implemented by a software application within a computing device, such as the orchestrator 1010 (FIG. 1) if it performs unthrottling, or by a separate unthrottling routine 1032 (FIG. 1) if implemented apart from the orchestrator 1010, as examples. In the example below, the operations will be described as being carried out by the "unthrottling routine" however it will be appreciated that these operations may be carried out by the orchestrator or another software component within the computing device.

The method 600 may include an operation 602 of detecting a reassessment trigger or unthrottling trigger. In some embodiments, the unthrottling routine may execute only on detection of an unthrottling trigger event or state. Such an event or state may be time-based, such as a periodic reassessment, in some cases. The unthrottling trigger event or state may be based on an operating condition of the system or platform, such as a detection of processor capacity, a drop in rate of new requests below a threshold, detection of active job queue capacity, or other such states. However, in some cases, the method 600 runs more or less continuously as a background process without a reassessment or unthrottling trigger provided there is at least one job in the throttled queue.

In operation 604, the unthrottling routine identifies a userID for a throttled job request in the throttled queue. As noted above, throttled job requests may be stored in the throttled queue in a data structure as a data entry that includes the userID associated with that job request. The unthrottling routine then determines, in operation 606, whether the count of jobs for that userID in the active job queue is lower than the active job cap number for that userID (and feature set, if applicable). If not, then the unthrottling routine cannot unthrottle that job yet, and it returns to operation 604 to check another throttled job. The unthrottling routine may query the counter for a current count of active job requests in the active job queue for the userID. In cases where the counter maintains a real-time record of the current count by userID in an accessible and readable data structure in memory, the unthrottling routine may index and read that data structure by the userID rather than querying the counter.

If, in operation 606, the unthrottling routine determines that the count of active jobs being processed for the userID is lower than the active job cap number, then it may unthrottle one or more throttled jobs for that userID. Accordingly, in operation 608 the unthrottling routine moves one or more throttled jobs for that userID from the throttled queue to the active job queue. The throttled job is removed or deleted from the throttle queue and is added to the active job queue so as to put it in the queue for processing. In some cases, more than one throttled job for the userID may be moved to the active job queue. For example, if the count is lower than the active job cap number by an integer X, then up to X throttled jobs for that userID may be unthrottled by moving them to the active job queue.

In one implementation, instead of moving a throttled job to the active job queue, the unthrottling routine could cause processor to initiate processing of that throttled job request directly from throttled queue; however, this implementation would result in undercounting active job requests associated with that userID since the counter may rely on counting jobs in the active job queue. Such an implementation may need to take into account any throttled jobs that are being actively processed directly from the throttled queue when determining a count of active job requests.

In any of the above-described example methods or processes it will be understood that certain operations described as occurring in sequence may be implemented in a different sequence or carried out in parallel without impacting the overall functioning of the method or process.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
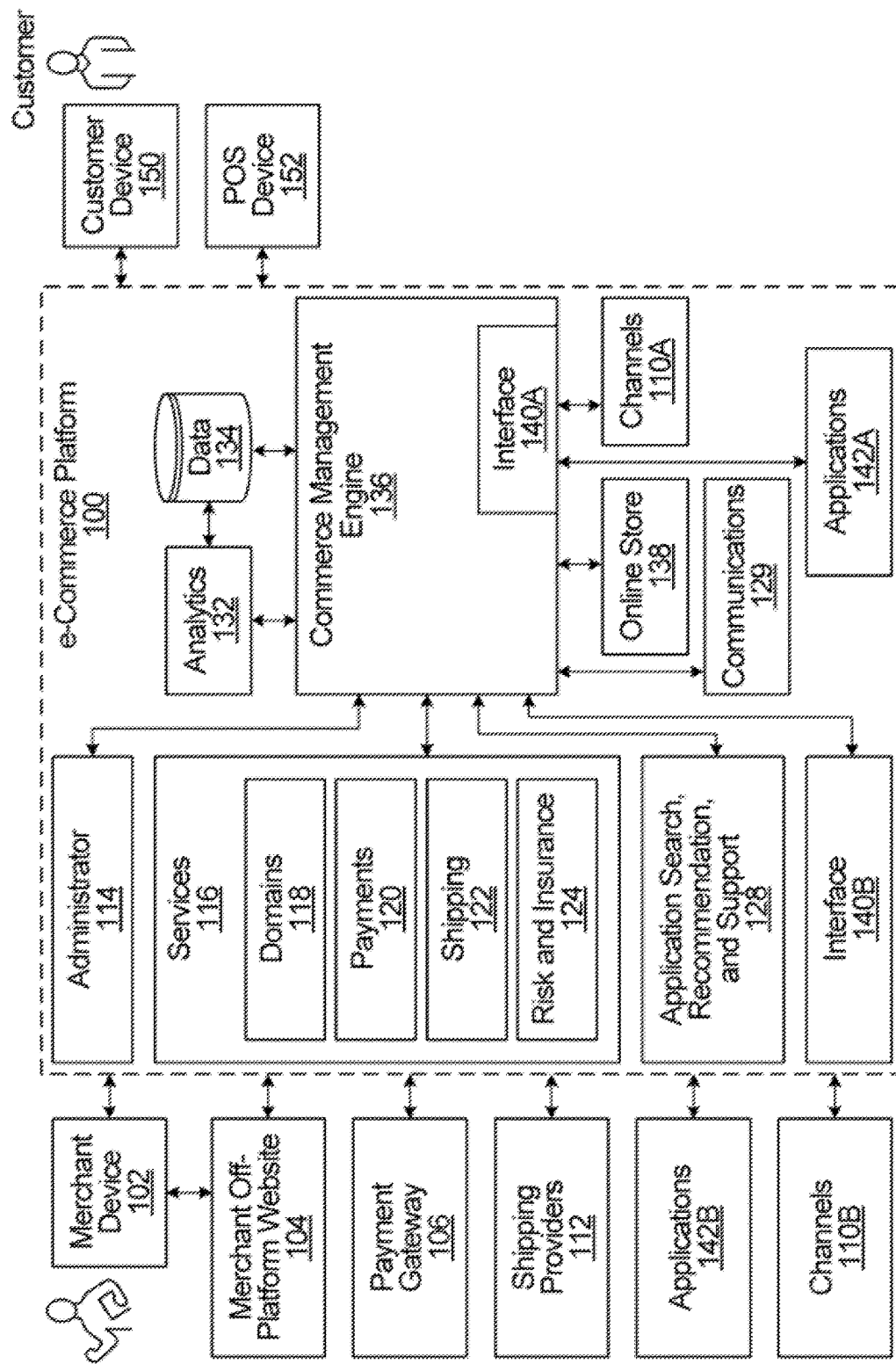
FIG. 7 is a block diagram of an e-commerce platform, in accordance with an example embodiment.

FIG. 7 illustrates an example e-commerce platform 100, according to one embodiment. The e-commerce platform 100 may be exemplary of the e-commerce platform 105 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152. In particular, the POS devices 152 associated with the e-commerce platform 100 may be configured to implement any one or more of the example methods 300 to 600 described above with reference to FIGS. 3 to 6.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
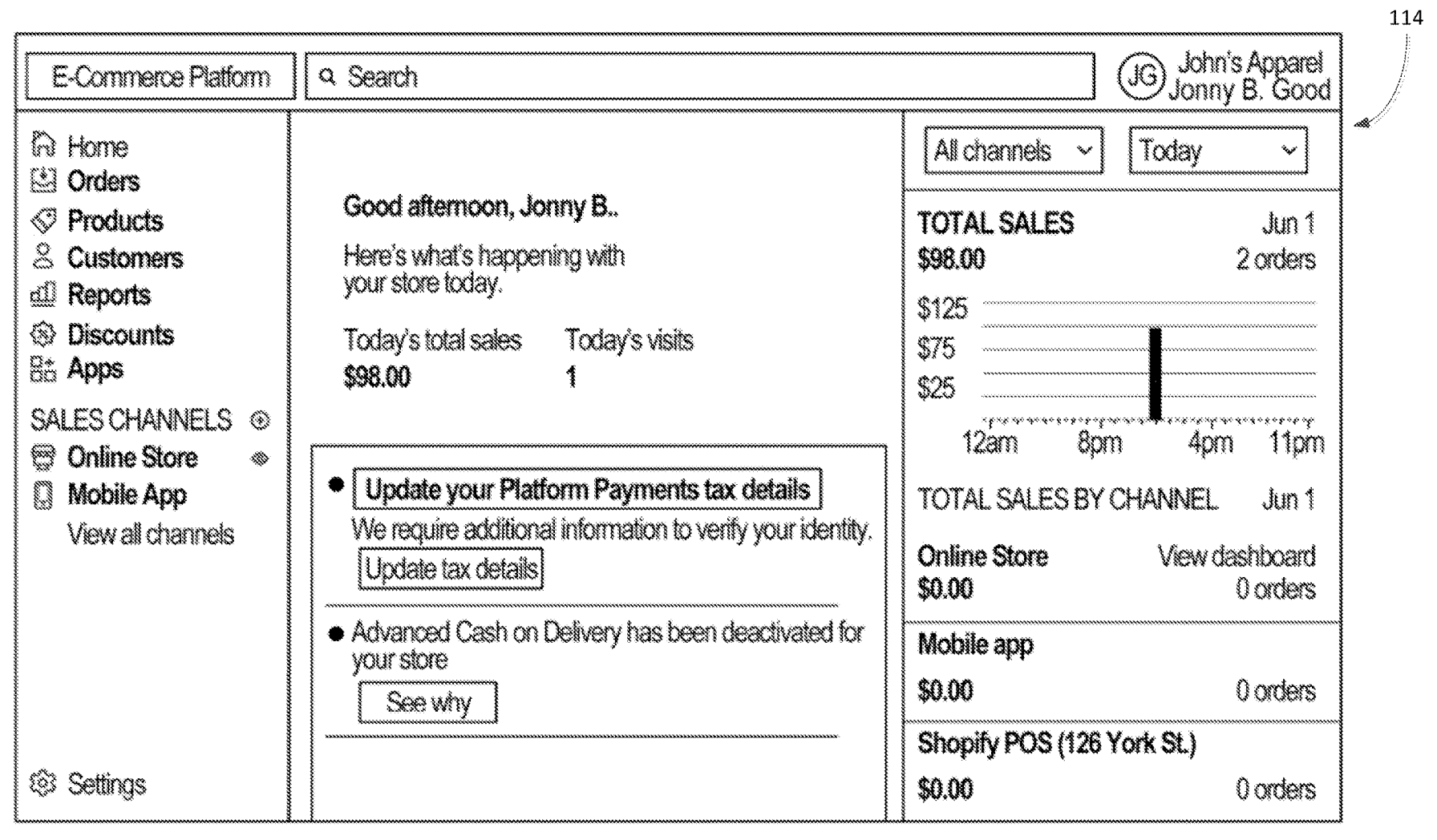

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computing device, comprising:
one or more processors;
one or more data storage units; and
an application stored in the one or more data storage units and having processor-readable instructions that, when executed by the one or more processors, are to cause the one or more processors to:
receive a job request to implement one or more actions, the job request associated with a particular user;
compare a count of active job requests being currently processed for the particular user with an active job cap number for that user; and
selectively process the job request based on the comparison of the count of active job requests currently processed for the particular user with the active job cap number for that user,
wherein when the count of active job requests being currently processed for the particular one of the users does not exceed the active job cap number, the job request is added to an active job queue for processing, and
wherein when the count of active job requests being currently processed for the particular user exceeds the active job cap number, the job request is placed on a throttled queue to await later processing when an updated count of active job requests being currently processed for the particular user is below the active job cap number for that user.

2. The computing device of claim 1, wherein the instructions, when executed by the one or more processors, are to cause the one or more processors to later process the job request added to the throttled queue by transferring the job request from the throttled queue to the active job queue.

3. The computing device of claim 2, wherein the instructions, when executed by the one or more processors, are to further cause the processors to determine the updated count of active job requests being currently processed for the particular user in response to detecting an unthrottling trigger event.

4. The computing device of claim 1, wherein the active job cap number for the particular user is associated with a feature set corresponding to the job request.

5. The computing device of claim 1, wherein the active job queue includes, for each job request in the active job queue, a user identifier identifying a user associated with that job request.

6. The computing device of claim 5, wherein the instructions, when executed by the one or more processors, are to further cause the one or more processors to determine the count of active job requests being currently processed for the particular user by counting a number of user identifiers in the active job queue identifying that user.

7. The computing device of claim 1, wherein the instructions, when executed by the one or more processors, are to cause the one or more processors to place the job request on the throttled queue on condition that the one or more processing units determine that the job request is not a high priority job request.

8. The computing device of claim 1, wherein the instructions, when executed by the one or more processors, are to further cause the one or more processors to:
- receive a second job request to implement a second action associated with the particular user;
- determine that a current count of active job requests being processed for the particular user exceeds the active job cap number for that user;
- determine that the second job request is a high priority job request; and
- in response, add the second job request to the active job queue instead of the throttled queue.

9. The computing device of claim 1, wherein the job request is generated responsive to detecting a trigger condition associated with the action.

10. A computer-implemented method comprising:
- receiving a job request to implement one or more actions, the job request associated with a particular user;
- comparing a count of active job requests being currently processed for the particular user with an active job cap number for that user; and
- selectively processing the job request based on the comparison of the count of active job requests currently processed for the particular user with the active job cap number for that user,
  - wherein when the count of active job requests being currently processed for the particular user does not exceed the active job cap number, the job request is added to an active job queue for processing, and
  - wherein when the count of active job requests being currently processed for the particular user exceeds the active job cap number, the job request is placed on a throttled queue to await later processing when an updated count of active job requests being currently processed for the particular user is below the active job cap number for that user.

11. The method of claim 10, wherein the later processing of the job request added to the throttled queue includes transferring the job request from the throttled queue to the active job queue.

12. The method of claim 11, wherein determining the updated count of active job requests being currently processed for the particular user occurs in response to detecting an unthrottling trigger event.

13. The method of claim 10, wherein the active job cap number for the particular user is associated with a feature set corresponding to the job request.

14. The method of claim 10, wherein the active job queue includes, for each job request in the active job queue, a user identifier identifying a user associated with that job request.

15. The method of claim 14, further comprising determining the count of active job requests being currently processed for the particular user by counting a number of user identifiers in the active job queue identifying that user.

16. The method of claim 10, wherein placing the job request on the throttled queue requires, as a precondition, determining that the job request is not a high priority job request.

17. The method of claim 10, further comprising:
- receiving a second job request to implement a second action associated with the particular user;
- determining that a current count of active job requests being processed for the particular user exceeds the active job cap number for that user;
- determining that the second job request is a high priority job request; and
- in response, adding the second job request to the active job queue instead of the throttled queue.

18. The method of claim 10, wherein the job request is generated responsive to detecting a trigger condition associated with the action.

19. A non-transitory, computer-readable medium storing computer-executable instructions that, when executed by one or more processors, are to cause the one or more processors to:
- receive a job request to implement one or more actions, the job request associated with a particular user;
- compare a count of active job requests being currently processed for the particular user with an active job cap number for that user; and
- selectively process the job request based on the comparison of the count of active job requests currently processed for the particular user with the active job cap number for that user,
  - wherein when the count of active job requests being currently processed for the particular user does not exceed the active job cap number, the job request is added to an active job queue for processing, and
  - wherein when the count of active job requests being currently processed for the particular user exceeds the active job cap number, the job request is placed on a throttled queue to await later processing when an updated count of active job requests being currently processed for the particular user is below the active job cap number for that user.

20. The non-transitory, computer-readable medium of claim 19, wherein the instructions, when executed by the one or more processors, are to cause the one or more processors to later process the job request added to the throttled queue by transferring the job request from the throttled queue to the active job queue.

* * * * *